May 7, 1946.  T. B. KEMNER  2,399,681
SCAFFOLD CLAMP AND COUPLING
Filed April 12, 1944  2 Sheets-Sheet 1
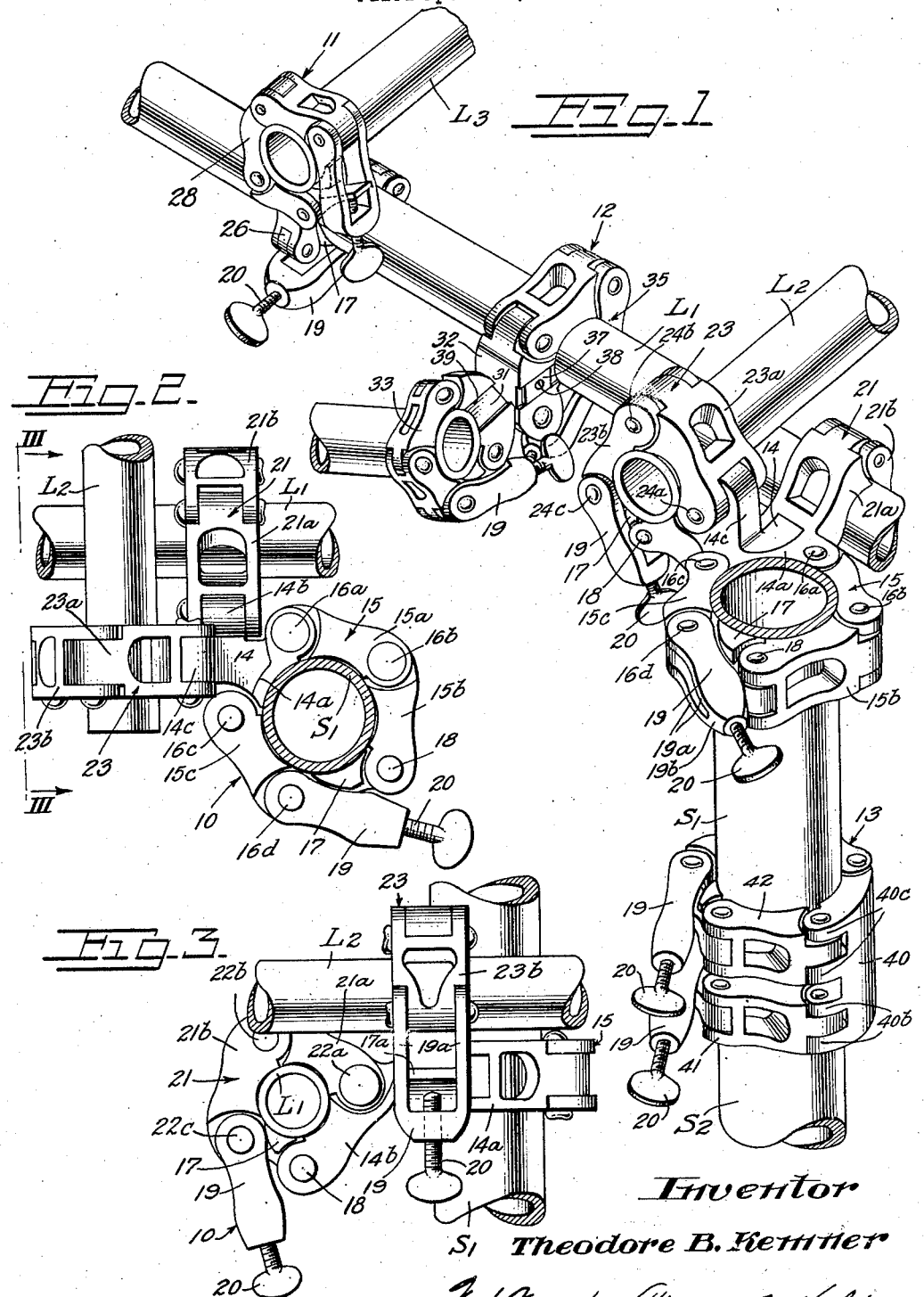
Inventor
Theodore B. Kemner
By [signature]
Attorney

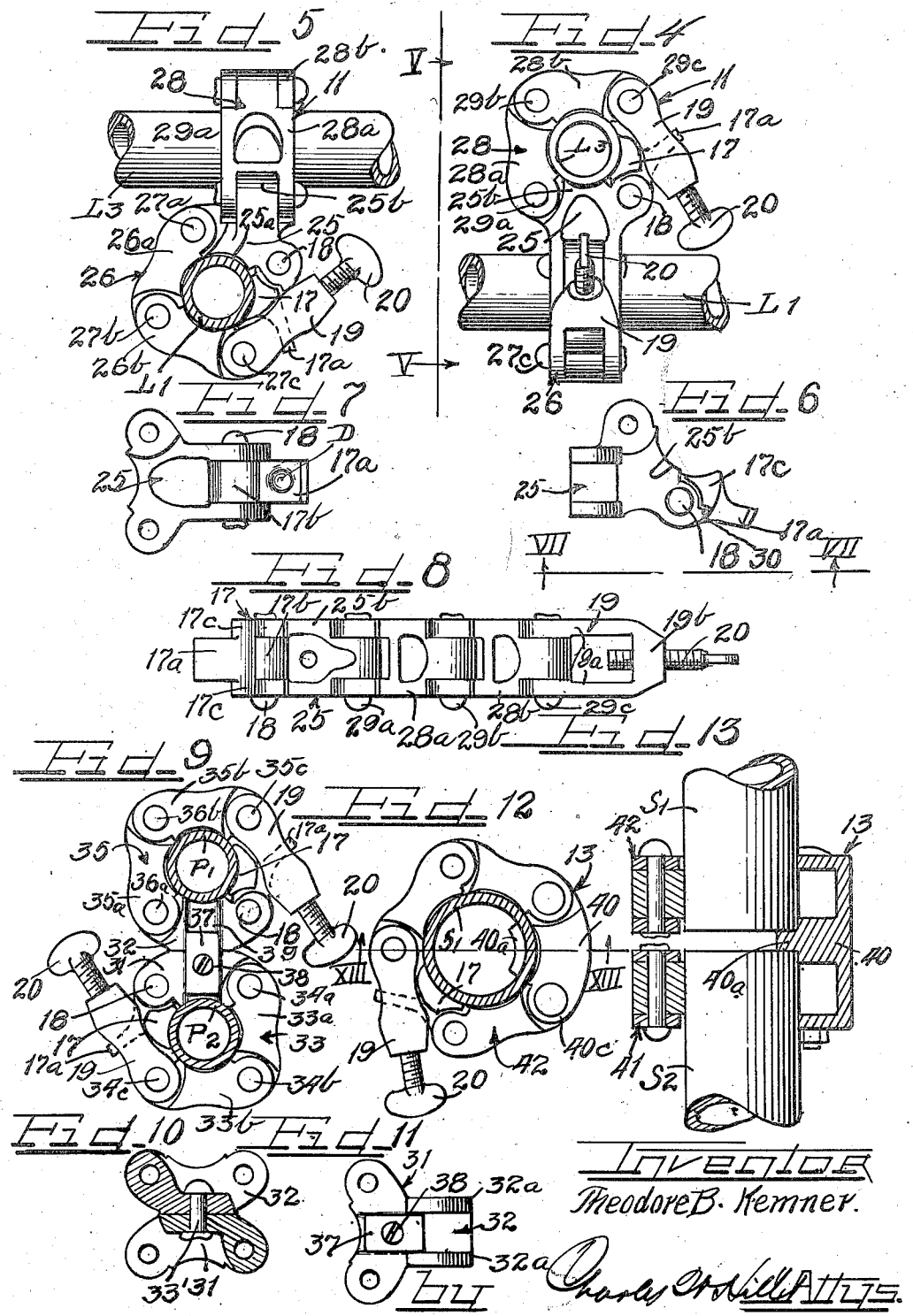

Patented May 7, 1946

2,399,681

UNITED STATES PATENT OFFICE 2,399,681

SCAFFOLD CLAMP AND COUPLING

Theodore B. Kemner, Quincy, Ill.

Application April 12, 1944, Serial No. 530,712

12 Claims. (Cl. 304—40)

This invention relates to clamps or couplings for securing tubular or pipe-type scaffolding in fixed rigid position.

Specifically, the invention deals with scaffold couplings each having a plurality of wrap-around adjustable articular lashings or thongs accommodating pipes or scaffold pieces of various circumferences and arranged on head head pieces to rigidly secure together a standard with two ledgers, or a pair of ledgers, or a ledger and a cross tie, or a pair of cross ties, or a pair of standards.

A feature of the invention is the provision of a minimum number of forms of scaffold couplings accommodating all types of tubular or pipe scaffolding erection.

Each of the various forms of couplings of this invention has a head with a plurality of wrap-around lashings composed of pivoted-together or jointed metal sections. Each lashing has one free end section in the form of a yoke carrying a clamping screw threaded through the bight thereof and extending between the legs thereof. Each lashing also has another free end section composed of a shoe for underlying a ledger to support it during the coupling operation. The shoe has a tongue or tail piece for projecting between the legs of the yoke on the other end of the lashing to be acted on by the clamping screw for tightening the lashing securely around the inserted ledger or other tubular scaffolding piece.

The clamping screw operating in the yoke section cooperates with the shoe to provide a lashing which will accommodate reception of pipes or tubes of various circumferences. For example, pipes from one and one-quarter inch to one and three-eighths inch outside diameter can be accommodated without substitution or addition of sections of the lashing. The addition of sections make it possible to use pipes or tubes of non-standard diameters.

The metal sections of the lashings have concave inner faces receiving the pipes, but these faces are not of circular section but are curved to bear on the pipe along a plurality of areas around the pipe circumference, thereby accommodating pipes of different diameters such as one and one-quarter inches to one and three-eighths inches. The plural pipe-engaging areas securely grip different sized pipes.

An important feature of the invention is that all horizontal ledger pipes are placed in a natural position and are supported on the coupling even before the lashings are wrapped there- around, so that it is not necessary to manually hold the pipes in position.

Four types of couplings according to this invention are herein illustrated. The first type is a three-way combination that clamps one vertical standard and two horizontal ledgers in fixed relation, thereby reducing the number of clamps heretofore needed to secure three pipes in fixed relation.

The second form of clamp is a two-way combination similar to the above-described three-way combination except that only two pipes are held in fixed relation.

The third illustrated form of coupling is a swivel-type unit especially well adapted for securing a cross tie to a ledger, or for securing a pair of cross ties together. This swivel-type coupling can be locked so that the pair of lashings thereof receive pipes in right angle relation or in parallel relation.

The fourth illustrated form of coupling according to this invention is for securing a pair of pipes such as standards in axially aligned relationship.

All of the illustrated types of couplings have the adjustable lashings composed of pivoted-together sections, and having clamping screws associated therewith to vary the effective gripping circumference thereof.

It is, then, an object of the invention to provide a minimum number of forms of adjustable scaffold couplings to accommodate all needs in scaffold erection.

Another object of the invention is to provide scaffold couplings with adjustable wrap-around lashings accommodating scaffold pieces of varying circumferences.

A still further object of the invention is to provide scaffold couplings having head pieces carrying a plurality of wrap-around adjustable lashings each composed of pivoted-together metal sections adapted to be rigidly clamped around a tubular type scaffolding piece.

A still further object of the invention is to provide a three-way scaffold coupling adapted to fixedly secure together a standard and a pair of horizontal ledgers.

Another object of the invention is to provide a swivel-type scaffold clamp having adjustable lashings adapted to be disposed in angular or parallel relationship.

A still further object of the invention is to provide a scaffold clamp which has a receptacle for a ledger pipe to support the pipe during the clamping operation.

Other and further objects of the invention will be apparent to those skilled in the art from the following detailed description of the annexed sheets of drawings which, by way of preferred examples, illustrate four embodiments of the invention.

On the drawings:

Figure 1 is a perspective view of a portion of a tubular scaffolding illustrating the four types of scaffold couplings according to this invention.

Figure 2 is a top plan view of the three-way coupling shown in the right-hand upper corner of Figure 1.

Figure 3 is a side elevational view taken along the line III—III of Figure 2.

Figure 4 is an end elevational view of the two-way coupling illustrated in Figure 1.

Figure 5 is a side elevational view of the coupling of Figure 4 taken along the line V—V of Figure 4.

Figure 6 is a fragmentary side view of the coupling head and shoe of Figure 4 illustrating the seat provided for the upper ledger pipe.

Figure 7 is a bottom plan view taken along the line VII—VII of Figure 6.

Figure 8 is a top plan view of the coupling of Figure 4 illustrating the top lashing in open position.

Figure 9 is a side elevational view, with parts in vertical cross section, illustrating the swivel-type coupling of this invention locked in position for holding two pipes in parallel relation.

Figure 10 is a transverse cross-sectional view taken through the swivelly connected heads of the coupling of Figure 9.

Figure 11 is a view of the coupling heads of Figure 9 illustrating the coupling heads in locked right angular position.

Figure 12 is a top plan view, with a part in horizontal cross section, of a coupling for holding pipes in axial alignment.

Figure 13 is a transverse cross-sectional view, with parts in elevation, taken along the line XIII—XIII of Figure 12.

As shown on the drawings:

In Figure 1 the characters $S_1$ and $S_2$ designate vertical standards or upright pipes of a scaffolding, the characters $L_1$ $L_2$ and $L_3$ designate ledgers of the scaffolding, and the character T designates a cross tie or brace of the scaffolding. The standards $S_1$ and the ledgers $L_1$ and $L_2$ are held together in rigid assembled relation by a three-way coupling 10 according to this invention. The ledgers $L_1$ and $L_3$ are held together in rigid assembled relation by a two-way coupling 11 according to this invention. The ledger $L_1$ and the cross tie T are held together in assembled relation by the swivel coupling 12 of this invention. The standards $S_1$ and $S_2$ are held in axially aligned secured-together relation by the coupling 13 of this invention.

As shown in Figures 1 to 3, the three-way coupling 10 has a head piece 14 with a portion 14a defining a vertical concave seat receiving the standard $S_1$ thereagainst and pivotally supporting a lashing or throng 15 for securing the standard in the seat. This lashing 15 is composed of a first metal section 15a pivoted to the head portion 14a by means of a pivot pin 16a, a second metal section 15b pivoted to the section 15a by means of a pivot pin 16b, and a third metal section 15c pivoted to the portion 14a by means of a pivot pin 16c. A shoe 17 is pivoted to the section 15b by means of a pivot pin 18, and this shoe has a standard-engaging face together with a tongue or tail portion 17a projecting therefrom.

The section 15c has a yoke member 19 pivoted thereon by means of a pivot pin 16d, and this yoke member has opposed legs 19a connected by a bight portion 19b. The tongue 17a of the shoe 17 fits between the legs 19a and has a dimple D (Fig. 7) receiving therein the end of a clamping screw 20 threaded through the bight 19b of the yoke to draw the lashing 15 tight around the standard $S_1$.

The head 14 also has an integral portion 14b defining a concave horizontal seat receiving the ledger $L_1$ and carrying a lashing 21 for securing the ledger in the seat. This lashing 21 is composed of a metal section 21a pivoted to the portion 14b by means of a pivot pin 22a, a metal section 21b pivoted to the section 21a by means of a pivot pin 22b, a metal yoke 19 pivoted to the section 21b by means of a pivot pin 22c, and a metal shoe 17 pivoted to the other end of portion 14b by means of a pivot pin 18. The shoe 17 has a tail portion 17a the same as the shoe for the lashing 15 cooperating with the yoke member 19.

The head 14 also has a portion 14c defining a concave horizontal seat receiving the ledger $L_2$ and carrying a lashing 23 for securing the ledger in this seat. The lashing 23 includes a metal section 23a pivoted to the upper end of portion 14c by a pivot pin 24a, a second metal section 23b pivoted to the section 23a by means of a pin 24b and a yoke 19 pivoted to the section 23b by a pin 24c. The portion 14c also has a forwardly projecting section carrying a pivot pin 18 and supporting a shoe 17. This forwardly projecting section and shoe 17 underlie the ledger $L_2$ to support the same even before the sections 23a and 23b are lashed therearound.

From the above descriptions of coupling 10, it should be understood that the coupling has a one-piece head 14 with three integral portions 14a, 14b and 14c projecting therefrom. The portion 14a defines a concave vertical receptacle and carries a lashing 15 for surrounding a vertical standard $S_1$. The portion 14b defines a concave horizontal receptacle for underlying the ledger $L_1$ and carries a lashing 21 to secure this ledger in the receptacle. The portion 14c projects vertically upward and horizontally forward from the head to define a horizontal section for underlying the ledger $L_3$ to support this ledger and also carries a lashing 23 to secure the ledger in the receptacle. The three portions 14a, 14b, and 14c carry the lashings 15, 21 and 23 in such a relation to secure two horizontal pipes to a vertical pipe with each of the horizontal pipes disposed at right angles to each other.

The lashing 15 is first secured on the standard $S_1$ and, when so secured, the portions 14b and 14c of the head 14 will project in right angular planes from the standard to underlie ledgers $L_1$ and $L_2$.

The two-way coupling 11 shown in Figures 1, 4 and 5 has a central head 25 with a portion 25a for seating on the ledger $L_1$ and carrying a lashing 26 together with a portion 25b for underlying the ledger $L_2$ and defining a seat for the ledger. The portion 25a has a lashing section 26a pivoted thereon by means of a pivot pin 27a. The section 26a pivotally supports a second section 26b on a pivot pin 27b. The section 27b, in turn, pivotally supports a yoke 19 on a pivot pin 27c. A shoe 17 is pivotally mounted on a pin 18 on the portion 25a and has the tail or finger 17a fitting between the yoke arms to be acted on by the thumbscrew 20 for clamping the lashing 26 tightly around the ledger L1.

The portion 25b of the head 25 carries a lashing 28 for encircling the ledger L2. This lashing 28 is composed of articulated metal sections including a section 28a pivoted to the portion 25b by means of a pin 29a, a section 28b pivoted to the section 28a by a pin 29b, and a yoke 19 pivoted to the section 28b by a pin 29c. A shoe 17 is pivoted by means of a pin 18 to the portion 25b at an end thereof remote from the pin 29a, and the shoe 17 contains a finger or tongue 17a projecting between the legs of the yoke to be acted on by the thumb screw 20 for clamping the ledger pipe tightly within the lashing.

The head 25 is readily saddled onto the top of the ledger L1, since the portion 25a and the shoe 17 carried thereby, define a rounded surface readfitting over the ledger. The sections 26a, 26b and yoke 19 are then readily wrapped around the ledger, and the lashing unit is tightened in clamped relation on the ledger. When so tightened, the ledger L2 is adapted to be readily seated on the portion 25b of the head and on the shoe 17 carried by this portion, since the head portion 25b and its shoe define a cylindrical receptacle for the ledger. The lashing 28 is then wrapped around the ledger and tightened.

As shown in Figures 6, 7, and 8, the head portion 25b has legs straddling a portion 17b of the shoe which receives the pin 18 therethrough and portions 17c of the shoe ride over the ends of these legs until striking abutments 30 thereon. These abutments prevent the shoe from swinging beyond a ledger-supporting position. In other words, the abutments act as stops to hold the shoe in the position shown in Figures 4 and 6, so that it will cooperate with the portion 25b to define a cylindrical receptacle for underlying the ledger L3. Similar stops can be provided on the head portions of the other couplings so that these portions will cooperate with the shoes to define the horizontal concave or cylindrical seats for the horizontal ledgers.

As shown in Figure 8, the portion 25b has a lug receiving the pin 29a and cooperating with legs on the section 28a so that the section 28a is swivelly mounted on the head but cannot twist relative to the head. The same structure is used for attaching the section 28b to the section 28a, and for attaching the yoke 19 to the section 28b.

The lashings provided by this invention therefore readily wrap around inserted scaffold structure, but cannot twist.

The swivel-type coupling 12 shown in Figures 1, 9, 10 and 11 is composed of two heads 31 and 32 swivelly connected by means of a pin 33' (Fig. 10). The head 31 carries a lashing 33 composed of a section 33a pivoted to the head by means of a pin 34a, a section 33b pivoted to the section 33a by means of a pin 34b, a yoke 19 pivoted to the section 33b by a pin 34c, and a shoe 17 pivoted to the other end of the head 31 by means of a pin 18.

The head 32 carries a lashing 35 composed of sections 35a and 35b with the section 35a pinned to the head by means of a pin 36a and the section 35b pinned to the section 35a by means of a pin 36b. A yoke 19 is pinned to the section 35b by means of a pin 35c and a shoe 17 is pinned to the other end of the head 32 by means of a pin 18.

As shown in Figure 1, the lashing 33 clamps around the cross tie T while the lashing 35 clamps around the ledger L1. In this figure, the cross tie T is at a 45° angle to the ledger L1, and the heads 31 and 32 are therefore disposed in 45° angular relation.

As shown in Figure 9, the heads 31 and 32 are adapted to be locked against swiveling to hold the lashings 33 and 35 in parallel relation for supporting a pipe P1 in spaced parallel relation above a pipe P2. To lock the heads 31 and 32 in the position shown in Figure 9, a plate 37 is held on the head 31 by means of a screw 38 threaded into the head. This plate extends beyond the head 31 to fit in a groove 39 formed in the head 32. When the plate is in the position shown in Figure 9, it will prevent swiveling of the heads 31 and 32, and will hold these heads to carry the lashings 33 and 35 for supporting pipes in parallel relation. The plate 37, as shown in Figure 1, is adapted to be moved out of the groove 39 so that the heads 31 and 32 can swivel relative to each other.

As shown in Figure 11, the plate 37 is also adapted to be moved into the space between fingers 32a of the head 32 to lock this head in right-angular relation relative to the head 31. When in this position, the pipes will be carried by the lashings 33 and 35 in right-angular relation.

The coupling 12 is, therefore, a two-way swivel coupling readily adapted for locking the lashings thereof in parallel relation, in right-angular relation, or in rotatable relation. The swivelly arranged lashings are suitable for connecting cross ties to ledgers in a scaffolding, or for connecting two cross ties together.

The coupling 13 shown in Figures 1, 12 and 13, is composed of a single head 40 with a tongue 40a projecting from the mid-portion thereof to extend between the standards S1 and S2 as shown in Figure 13. In assembling the coupling in a scaffolding, it is first clamped to a standard S2 with the tongue 40a overlying the standard. The head 40 has two pairs of fingers 40b and 40c projecting from each side thereof as shown in Figure 1. The fingers 40b carry lashing sections for providing a wrap-around lashing 41 including a yoke 19 and shoe 17 identically with the lashing sections described hereinabove while the other pairs of fingers 40c carry a lashing 42 above the lashing 41. The lashing 41 wraps around the standard S2 while the lashing 42 wraps around the standard S1 and the clamping screws 20 on the yokes 19 of each of the lashings are effective for tightly clamping the lashings onto the standards to hold the standards in fixed axial alignment.

As shown in Figures 1 to 5, 9 and 12, the concave pipe receiving faces of the head portions and lashing sections are not segments of circular cylinders since they do not have full seating relationship with a circular cylindrical pipe. As shown, these faces are relieved intermediate their ends to be spaced from the pipes and only engage the pipes along two spaced areas. Thus each lashing section and each pipe-receiving portion of the head of the coupling engage the pipe locally on spaced areas thereof and the lashing, when tightened around the pipe, has a plurality of non-slip grips on the pipe. The arrangement provides for the accommodation of different sized pipes by the lashings since these pipes will bear on a plurality of the gripping areas irrespective of their diameters.

It will be understood from the above descriptions that the invention provides two-way and three-way couplings which satisfy all requirements for building any type of tubular scaffolding. The three-way coupling rigidly connects a standard with two ledgers. The ledgers are held at right angles to each other. One of the two-way couplings rigidly connects a pair of ledgers at right angles to each other. A swivel two-way coupling is adapted for connecting a cross tie to a ledger, or for connecting a pair of cross ties. This same swivel coupling can be locked together for connecting scaffold tubes or pipes in right angle relation, or in spaced parallel relation. Another type of coupling according to this invention connects tubular scaffold sections in axially aligned relation, and is especially adapted for connecting uprights or vertical standards.

Each of the couplings of this invention includes heads carrying wrap-around type lashings. These lashings are composed of articularly joined metal sections, and have clamping means associated therewith so that the lashings can be tightened around tubular scaffolds. The heads of the couplings cooperate with shoes to define seats for scaffold pieces to support these pieces even before the lashings are wrapped around the pieces. This obviates the necessity for holding the section pieces in position during the coupling or clamping operation.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A pipe coupling comprising a head piece, said head piece having a plurality of portions thereon defining arcuate seats, a shoe having an arcuate face pivotally mounted at one end of each arcuate portion to continue the arcuate surface thereof, a first metal section pivoted to the other end of each arcuate portion, a second metal section pivoted to each first metal section, a yoke member pivoted to each second metal section, said yoke members adapted to straddle said shoes, and a screw threaded through the bight of each yoke member for acting on said shoe to clamp the metal sections and yoke members around inserted pipes.

2. A scaffold clamp comprising a head piece having a plurality of arcuate faces, an arcuate shoe pivotally associated with said head at an end of each arcuate face thereof, each of said shoes having a projecting tongue with a bolt-receiving depression in the face thereof, jointed members pivotally associated with said heads at the other end of each arcuate face thereof, and said jointed members including an end joint having a screw associated therewith for seating in the depression of said shoe tongue to clamp the members around an inserted cylindrical object.

3. A scaffold coupling comprising a main body defining a plurality of seats for tubular scaffold pieces, pivoted-together sections connected to an end of each of said seats, a yoke member pivotally connected to each end section, screw means threaded through the yoke member, a clamping shoe pivotally connected to the other end of each seat and a tongue on each shoe for projecting into the yoke member to be acted on by the screw means for locking the pivoted-together sections around scaffold pieces.

4. A three-way pipe coupling comprising a head piece, integral arms on said head piece defining arcuate pipe seats, lashings composed of pivoted-together sections swingably mounted on the ends of said arms, each of said lashings having a first free end section composed of a yoke with a clamping screw threaded through the bight thereof and a second free end composed of a clamping shoe having a tail portion for projecting into the yoke to be acted on by the clamping screw for locking the lashing around a pipe.

5. A scaffold clamp comprising a metal head member defining an arcuate seat, a tongue on said head member projecting from said seat adapted to lie between a pair of axially aligned pipes, wrap-around lashings pivotally connected to said head on opposite sides of said tongue, and clamps on each of said lashings for tightening the lashings around the pipes whereby said coupling will connect pipes in axially aligned relation.

6. A coupling comprising a head piece, a plurality of wrap-around lashings carried by said head piece in spaced relation to each other, each of said lashings being composed of a series of articulated metal sections in non-twisting relation to each other and to the head piece, and clamping mechanism associated with each lashing for fixedly tightening the lashing around an inserted member.

7. A scaffold coupling comprising a head member having a first portion defining a first seat for a first tube and a second portion defining a second seat for a second tube in angular relation to the said first seat, non-twistable wrap-around lashings swingably mounted on each of said portions in non-twisting relation, said lashings having a series of seats cooperating with the seats of the head member to grip a tube around which they are wrapped, and clamps associated with said lashings to draw the same tightly around the first and second tubes.

8. A scaffold clamp or coupling for rigidly connecting tubular scaffold pieces in predetermined relation which comprises a head having portions defining concave seats in predetermined angular relation, wrap-around lashings for each of said portions, each wrap-around lashing being composed of a series of rigid members in articulate non-twisting relation to each other and to the head portion, said rigid members having concave seats cooperating with the seats of the head portions for gripping a tubular scaffold piece around which they are wrapped, and screw clamp means associated with each of said lashings for drawing the same tightly around a tubular scaffold piece seated on said concave seats.

9. A three-way scaffold coupling comprising a main body unit defining a first seat for a standard, a second seat for a first ledger, and a third seat for a second ledger in right-angular relation to the first ledger, lashings pivoted to the main body unit and associated with each of said seats for wrapping around the ledgers or standards on the seats, each of said lashings being composed of pivoted-together metal sections having seats cooperating with the seat of the main body unit with which they are associated to form therewith a series of gripping seats, the pivot connections between said sections and said main body unit being arranged to hold the sections in non-twisting relation to each other and to the body unit, and a clamp associated with each lashing for securing the lashing around a ledger or standard.

10. A scaffold coupling comprising a pair of head members, means swively connecting said head members, a wrap-around lashing associated with each head member for wrapping around scaffold pipes to connect the pipes in swivel relation, each lashing being composed of a series of pivoted-together sections in non-twisting relation to each other and to the head piece, and take-up screws for said lashings to tighten the lashings around inserted scaffold pipes.

11. A scaffold clamp comprising a head member, wrap-around lashings associated with the head member, each of said lashings being composed of a series of sections in non-twisting articulate relation to each other and to the head member, and said sections and head member having scaffold-receiving faces contoured to engage a scaffold pipe at a plurality of spaced areas around the circumference of the pipe.

12. A scaffold clamp comprising a head piece having a plurality of pipe seating faces, a wrap-around pipe lashing for each seating face of the head, each lashing being composed of a series of rigid sections with pipe-seating faces for cooperating with the seating faces of the head to firmly engage pipes, each lashing having free end portions, means joining the rigid sections of each lashing for swinging movement in one plane only to prevent twisting of the sections relative to each other, means joining the lashings to the head piece for swinging movement only in the same plane of swinging movement of the sections constituting the lashing to prevent twisting of the lashings relative to the head piece, and locking means associated with the free ends of the lashings to lock the lashings around inserted pipes.

THEODORE B. KEMNER.